United States Patent
Mori (10) Patent No.: US 9,056,528 B2
(45) Date of Patent: Jun. 16, 2015

(54) PNEUMATIC TIRE WITH SPECIFIED CARCASS PLY TURN-BACK PORTIONS

(75) Inventor: Arata Mori, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/995,789

(22) PCT Filed: Mar. 7, 2012

(86) PCT No.: PCT/JP2012/055879
§ 371 (c)(1),
(2), (4) Date: Aug. 21, 2013

(87) PCT Pub. No.: WO2012/121305
PCT Pub. Date: Sep. 13, 2012

(65) Prior Publication Data
US 2013/0327460 A1     Dec. 12, 2013

(30) Foreign Application Priority Data
Mar. 7, 2011   (JP) .................................. 2011-049698

(51) Int. Cl.
*B60C 15/06* (2006.01)
*B60C 15/00* (2006.01)

(52) U.S. Cl.
CPC ......... *B60C 15/0009* (2013.04); *B60C 15/0063* (2013.04); *B60C 15/0054* (2013.04);
(Continued)

(58) Field of Classification Search
CPC ............ B60C 15/0054; B60C 15/0063; B60C 15/009; B60C 15/0036; B60C 15/0045; B60C 15/0603; B60C 15/0607; B60C 15/06; B60C 15/00; B60C 2015/061; Y10T 152/10837

USPC .................................. 152/552, 554, 541, 546
See application file for complete search history.

(56) References Cited

U.S. PATENT DOCUMENTS 5,236,031 A    8/1993  Honbo et al.
5,674,331 A *  10/1997  Saeki et al. ............... 152/552 X
(Continued)

FOREIGN PATENT DOCUMENTS

CN    1331639 A    1/2002
CN    103108759 A   5/2013
(Continued)

OTHER PUBLICATIONS

International Search Report for PCT/JP2012/055879 dated Jun. 12, 2012.
(Continued)

*Primary Examiner* — Adrienne C Johnstone
(74) *Attorney, Agent, or Firm* — Sughrue Mion, PLLC (57) ABSTRACT

In a carcass (13), between first sections (13A) in which an inter-cord distance between a body portion and turn-back portions gradually decreases outward in a tire radial direction and second sections (13B) in which the inter-cord distance gradually increases, there are disposed first distance-invariant sections (13C) in which the turn-back portions (14B) are brought closer to the body portion (14A) that becomes a substantial bending neutral axis and in which the inter-cord distance is constant, so compressive force acting on the cords of the turn-back portions (14B) can be reduced. By disposing the first distance-invariant sections (13C) between the first sections (13A) and the second sections (13B), the direction of the cords of the turn-back portions (14B) is not suddenly changed, so it becomes difficult for stress to concentrate in the rubber between the cords of the turn-back portions (14B).

4 Claims, 6 Drawing Sheets

(52) U.S. Cl.
CPC ..... *Y10T152/10837* (2015.01); *B60C 15/0036* (2013.04); *B60C 15/06* (2013.01); *B60C 15/0607* (2013.04); *B60C 2015/061* (2013.04); *B60C 2015/0621* (2013.04)

(56) References Cited

U.S. PATENT DOCUMENTS

| | | | |
|---|---|---|---|
| 6,408,914 | B1 | 6/2002 | Lamock et al. |
| 6,508,285 | B2 * | 1/2003 | Ueyoko .................... 152/552 X |
| 6,543,504 | B2 * | 4/2003 | Auxerre .................... 152/552 X |
| 6,742,559 | B2 * | 6/2004 | Iwamura .................. 152/554 X |
| 6,752,186 | B1 * | 6/2004 | Ueyoko .................... 152/552 X |
| 6,962,183 | B2 * | 11/2005 | Ueyoko et al. ............ 152/552 X |
| 7,077,182 | B2 * | 7/2006 | Nagahara et al. |
| 7,523,774 | B2 * | 4/2009 | Lahure et al. ............ 152/552 X |
| 8,327,898 | B2 * | 12/2012 | Oogane .................... 152/552 X |
| 2002/0043320 | A1 | 4/2002 | Wada |
| 2004/0007305 | A1 * | 1/2004 | Ueyoko ........................ 152/552 |
| 2009/0236022 | A1 * | 9/2009 | Matsuda et al. |
| 2010/0252164 | A1 * | 10/2010 | Oogane |
| 2013/0174956 | A1 * | 7/2013 | Toyoda et al. |
| 2013/0192738 | A1 * | 8/2013 | Sasaki ........................... 152/552 |

FOREIGN PATENT DOCUMENTS

| | | | |
|---|---|---|---|
| JP | 4-185510 A | | 7/1992 |
| JP | 05178039 A | * | 7/1993 |
| JP | 09272313 A | * | 10/1997 |
| JP | 11-227412 A | | 8/1999 |
| JP | 2000225816 A | * | 8/2000 |
| JP | 2002-59717 A | | 2/2002 |
| JP | 2002-507515 A | | 3/2002 |
| JP | 2002-160510 A | | 6/2002 |
| JP | 2003011622 A | * | 1/2003 |
| JP | 2003-320811 A | | 11/2003 |
| JP | 2006-218936 A | | 8/2006 |
| JP | 2009-113715 A | | 5/2009 |
| WO | 02/085647 A1 | | 10/2002 |
| WO | WO-2012/017673 A1 | * | 2/2012 |

OTHER PUBLICATIONS

Communication dated Nov. 3, 2014, issued by the European Patent Office in counterpart Application No. 12754499.7.
Communication dated Dec. 16, 2014, issued by the Japanese Patent Office in counterpart Japanese application No. 2011-049698.
Communication dated Feb. 28, 2015 from the State Intellectual Property of the Peoples' Republic of China in counterpart Application No. 201280006926.0.

* cited by examiner

PNEUMATIC TIRE WITH SPECIFIED CARCASS PLY TURN-BACK PORTIONS

CROSS REFERENCE TO RELATED APPLICATIONS

This application is a National Stage of International Application No. PCT/JP2012/055879 filed Mar. 7, 2012, claiming priority based on Japanese Patent Application No. 2011-049698 filed Mar. 7, 2011, the contents of all of which are incorporated herein by reference in their entirety.

TECHNICAL FIELD

The present invention pertains to a pneumatic tire in which a carcass ply is turned up around bead cores and particularly relates to a pneumatic tire in which the durability of bead portions has been improved.

BACKGROUND ART

When a pneumatic tire having a radial structure is subjected to a load, bending moments act on the bead portions in accompaniment with deformation in which the bead portions collapse outward in the tire axial direction in the regions on the tire radial direction outer sides of the rim flanges. Because of this, tensile force acts on the tire inner sides of the bead portions and compressive force acts on the tire outer sides of the bead portions taking the bending neutral axis as a boundary. The compressive force acts on the cords of the turn-back portions of the carcass ply turned back around the bead cores and produces compressive strain, and when the compressive strain becomes excessive, there are cases where it leads to fatigue fracture of the cords of the carcass ply.

Conventionally, pneumatic tires for construction vehicles have been proposed in which the durability of the bead portions is improved by suppressing compressive strain of the cords of the turn-back portions and suppressing fatigue fracture of the turn-back portions (e.g., see patent citations 1 and 2).

In the pneumatic tires of patent citations 1 and 2, compressive strain produced in the cords of the turn-back portions is suppressed and fatigue fracture of the cords of the turn-back portions is suppressed by gradually decreasing the inter-cord distance between the body portion and the turn-back portions of the carcass outward in the tire radial direction from the bead cores until the inter-cord distance first reaches a minimum value and then gradually increasing the inter-cord distance until the inter-cord distance reaches a maximum value, to thereby optimize the distance and so forth from the baseline of the applicable rim to the positions at which the inter-cord distance reaches the minimum value and the maximum value.

In the compressed regions on the outer sides of the bending neutral axis, shear strain and compressive strain decrease in proportion to the distance from the outer surfaces of the bead portions, so in the conventional art, local concentration of compressive strain in the turn-back portions is avoided and cord fracture is suppressed by placing, in proximity to the bending neutral axis, a zone in which the compressive strain of the turn-back portions becomes concentrated and which becomes the center of occurrence of cord fracture.

CITATION LIST

Patent Literature

Patent Citation 1: JP-A No. 2009-113715
Patent Citation 2: JP-A No. 4-185510

SUMMARY OF INVENTION

Technical Problem

In conventional pneumatic tires, fatigue fracture of the cords of the turn-back portions is suppressed by gradually decreasing the inter-cord distance between the body portion and the turn-back portions of the carcass outward in the tire radial direction from the bead cores until the inter-cord distance first reaches a minimum value and then gradually increasing the inter-cord distance until the inter-cord distance reaches a maximum value, but when the tire is subjected to a load and the bead portions become deformed, stress concentrates in the rubber between the body portion and the turn-back portions in the parts in which the inter-cord distance has been decreased to the minimum value, and when an excessive load acts in particularly severe environments, there are cases where this produces cracks in this rubber, so there has been room for improvement in terms of further improving the durability of the bead portions.

In consideration of the above circumstances, it is an object of the present invention to suppress compressive strain produced in the turn-back portions of the carcass, suppress fatigue fracture of the cords in the turn-back portions of the carcass, mitigate stress concentration produced in the rubber between the body portion and the turn-back portions, and thereby further improve the durability of the bead portions.

Solution to Problem

An invention pertaining to a first aspect is a pneumatic tire comprising: a carcass that is disposed toroidally bridging a pair of bead portions, the carcass having a carcass ply that includes plural radial carcass cords and that is equipped with a body portion positioned between the bead portions and with turn-back portions turned back from an inner side to an outer side around bead cores of the bead portions, and the carcass having first sections in which an inter-cord distance between the body portion and the turn-back portions gradually decreases outward in a tire radial direction from the bead cores, second sections that are disposed on the tire radial direction outer sides of the first sections and in which the inter-cord distance between the body portion and the turn-back portions of the carcass ply gradually increases outward in the tire radial direction from the bead cores, and first distance-invariant sections that interconnect tire radial direction outside parts of the first sections and tire radial direction inside parts of the second sections and in which the inter-cord distance between the body portion and the turn-back portions is constant; and stiffeners that are placed between the carcass body portion and the turn-back portions and extend outward in the tire radial direction from the bead cores.

Next, the action of the pneumatic tire pertaining to the first aspect will be described.

When the pneumatic tire is subjected to a load and the load produces deformation in which the bead portions collapse outward in the tire radial direction, the tire axial direction outer sides of the bending neutral axis undergo compressive deformation (strain), whereby compressive force acts on the radial carcass cords of the turn-back portions of the carcass ply, but by disposing, in the middle of the turn-back portions, the first sections in which the inter-cord distance between the body portion and the turn-back portions gradually decreases outward in the tire radial direction from the bead cores, the second sections that are disposed on the tire radial direction outer sides of the first sections and in which the inter-cord distance gradually increases outward in the tire radial direction from the bead cores, and the first distance-invariant sections that interconnect the tire radial direction outside parts of the first sections and the tire radial direction inside parts of the second sections and in which the inter-cord distance is constant, the radial carcass cords of the turn-back portions in the first distance-invariant sections become closer to the body portion of the carcass ply that becomes the substantial bending neutral axis, whereby the compressive force acting on the radial carcass cords of the turn-back portions is reduced, and fatigue fracture of the radial carcass ply of the turn-back portions caused by this compressive force can be suppressed.

Consequently, disposing, in alignment with the site where the compressive force acting on the radial carcass cords of the turn-back portions becomes highest, the first distance-invariant sections in which the inter-cord distance between the body portion and the turn-back portions is set narrow is most effective in terms of suppressing fatigue fracture of the radial carcass ply.

Moreover, in the pneumatic tire pertaining to the first aspect, the direction of the radial carcass cords does not suddenly change as a result of the first sections, in which the inter-cord distance between the body portion and the turn-back portions gradually decreases outward in the tire radial direction from the bead cores, and the second sections, in which the inter-cord distance gradually increases outward in the tire radial direction from the bead cores, being directly interconnected like in conventional tires; instead, the first distance-invariant sections, which extend in such a way as to interconnect the tire radial direction outside parts of the first sections and the tire radial direction inside parts of the second sections and in which the inter-cord distance between the body portion and the turn-back portions is constant, are disposed between the first sections and the second sections, so compared to conventional tires that do not have the first distance-invariant sections, concentration of stress is suppressed with respect to the rubber between the cords of the turn-back portions and the cords of the body portion in the middle parts between the first sections and the second sections, and the durability of the bead portions improves as a result of the occurrence of cracks from this rubber being suppressed.

Here, the inter-cord distance between the body portion and the turn-back portions is defined as the length (distance between cord centers) of a normal line drawn from a cord center of the cords on the tire axial direction outermost side of the body portion to a cord center of the cords on the tire axial direction innermost side of the turn-back portions.

Further, when using a mold to manufacture the pneumatic tire, the carcass ply and the rubber move because of pressure at the time of the molding, so as a practical problem it is difficult to make the inter-cord distance in the first distance-invariant sections a completely constant distance—that is, to make manufacturing error zero. Consequently, in the present invention, even though the inter-cord distance in the first distance-invariant sections is made constant, "constant" in the present invention is intended to include, as error at the time of manufacture, fluctuations within ±10% with respect to the average inter-cord distance in the first distance-invariant sections.

A pneumatic tire pertaining to a second aspect is the pneumatic tire pertaining to the first aspect, wherein a length of the first distance-invariant sections as measured along the tire radial direction is within a range of from 40% to 60% of a rim flange height of an applicable rim.

Next, the action of the pneumatic tire pertaining to the second aspect will be described.

By setting the length of the first distance-invariant sections as measured along the tire radial direction to the range of from 40% to 60% of the rim flange height of the applicable rim, a high stress concentration mitigating effect is obtained.

If the length of the first distance-invariant sections as measured along the tire radial direction is less than 40% of the rim flange height of the applicable rim, a high stress concentration mitigating effect is no longer obtained.

On the other hand, if the length of the first distance-invariant sections as measured along the tire radial direction exceeds 60% of the rim flange height of the applicable rim, the volume of the stiffeners decreases and the intrinsic action of the stiffeners, which is to secure the stiffness of the bead portions, tends to drop.

Consequently, in order to obtain a high stress concentration mitigating effect, setting the length of the first distance-invariant sections to the above range is preferred.

The "applicable rim" is a standard rim (or "approved rim" or "recommended rim") of an applicable size described in the following standards.

The standards are decided by industrial standards in force in the region where the tire is produced or used. For example, in Japan, the standards are prescribed by the JATMA Year Book of the Japan Automobile Tyre Manufacturers Association, Inc., in the U.S.A., the standards are prescribed by the Year Book of the Tire and Rim Association, Inc.; and in Europe, the standards are prescribed by the Standards Manual of the European Tire and Rim Technical Organization.

Further, the dimensions are measured in a state in which the tire has been mounted on a standard rim (or "approved rim" or "recommended rim") corresponding to the size of the tire decided by the standards and the tire has been inflated to the air pressure corresponding to the maximum load (maximum load rating) for a single wheel of the applicable size described in the standards.

A pneumatic tire pertaining to a third aspect is the pneumatic tire pertaining to the first aspect or the second aspect, wherein when a denotes a minimum value of the inter-cord distance between the body portion and the turn-back portions in the first sections, the first distance-invariant sections, and the second sections and b denotes a maximum value of the inter-cord distance between the body portion and the turn-back portions in the second sections, a/b is within a range of from 0.7 to 0.9.

Next, the action of the pneumatic tire pertaining to the third aspect will be described.

By setting a/b to the range of 0.7 to 0.9, a balance between securing the bending stiffness of the bead portions and reducing compressive strain produced in the turn-back portions can be achieved at a high level.

If the value of a/b is too small, the inter-cord distance becomes too small in the first distance-invariant sections, the bending stiffness of the bead portions becomes insufficient, the collapsing of the bead portions ends up becoming too large, and this leads to an increase in shear strain of the rubber interposed between the turn-back portions and the body portion.

On the other hand, if the value of a/b is too large, the turn-back portions of the carcass ply end up becoming too far away from the body portion in the first distance-invariant sections, and compressive strain produced in the radial carcass cords of the turn-back portions ends up increasing.

A pneumatic tire pertaining to a fourth aspect is the pneumatic tire pertaining to any one of the first aspect to the third aspect, wherein the carcass further has third sections that are disposed on the tire radial direction outer sides of the second sections and in which the inter-cord distance between the body portion and the turn-back portions of the carcass ply gradually decreases outward in the tire radial direction from the bead cores and second distance-invariant sections that extend from tire radial direction outside parts of the third sections to tire radial direction outside parts of the turn-back portions and in which the inter-cord distance between the body portion and the turn-back portions is constant.

Next, the action of the pneumatic tire pertaining to the fourth aspect will be described.

The carcass of a common pneumatic tire is configured in such a way that the inter-cord distance between the turn-back portions and the body portion of the carcass ply gradually decreases outward in the tire radial direction so that eventually the tire radial direction outside parts of the turn-back portions become parallel to the body portion.

When the body portion and the turn-back portions of the carcass ply are brought closer together, the shear strain of the rubber interposed between the radial carcass cords of the body portion and the radial carcass cords of the turn-back portions tends to increase, and if the tire is used in particularly severe conditions, there is the concern that this will cause separation in the rubber interposed between the radial carcass cords of the body portion and the radial carcass cords of the turn-back portions during the use period of the tire.

In the pneumatic tire pertaining to the fourth aspect, the second distance-invariant sections, in which the inter-cord distance between the body portion and the turn-back portions of the carcass ply is constant, extend on the tire radial direction outer sides of the third sections, so it becomes difficult for stress to concentrate in the rubber between the radial carcass cords of the tire radial direction outside parts of the turn-back portions and the radial carcass cords of the body portion, and the occurrence of separation is suppressed in this rubber.

A pneumatic tire pertaining to a fifth aspect is the pneumatic tire pertaining to any one of the first aspect to the fourth aspect, wherein a length of the second distance-invariant sections as measured along the tire radial direction is within a range of from 70% to 85% of a rim flange height of an applicable rim.

Next, the action of the pneumatic tire pertaining to the fifth aspect will be described.

By setting the length of the second distance-invariant sections as measured along the tire radial direction to the range of from 70% to 85% of the rim flange height of the applicable rim, a high stress concentration mitigating effect is obtained with respect to the rubber between the radial carcass cords of the tire radial direction outside parts of the turn-back portions and the radial carcass cords of the body portion.

If the length of the second distance-invariant sections as measured along the tire radial direction is less than 70% of the rim flange height of the applicable rim, a high stress concentration mitigating effect is no longer obtained with respect to the rubber between the tire radial direction outside parts of the turn-back portions and the body portion.

On the other hand, if the length of the second distance-invariant sections as measured along the tire radial direction exceeds 85% of the rim flange height of the applicable rim, the compressive strain of the radial carcass cords of the turn-back portions worsens, and this triggers turn-back carcass cord breakage.

Consequently, setting the length of the second distance-invariant sections to the above range is preferred.

A pneumatic tire pertaining to a sixth aspect is the pneumatic tire pertaining to the fifth aspect, wherein when b denotes a maximum value of the inter-cord distance between the body portion and the turn-back portions in the second sections and c denotes the inter-cord distance in the second distance-invariant sections, c/b is within a range of from 0.45 to 0.60.

Next, the action of the pneumatic tire pertaining to the sixth aspect will be described.

By setting c/b to the range of from 0.45 to 0.60, a balance between stress concentration in the rubber between the radial carcass cords of the tire radial direction outside parts of the turn-back portions and the radial carcass cords of the body portion and reducing compressive strain of the radial carcass cords of the turn-back portions can be achieved at a high level.

If the value of c/b is too small, the body portion and the turn-back portions of the carcass ply end up becoming too close to one another, and stress concentration in the rubber between the body portion and the turn-back portions of the carcass ply can no longer be mitigated.

On the other hand, if the value of c/b is too large, the turn-back portions of the carcass ply end up becoming too far apart from the body portion, compressive strain of the radial carcass cords of the turn-back portions worsens, and this triggers turn-back carcass cord breakage.

An invention pertaining to a seventh aspect is the pneumatic tire pertaining to any one of the first aspect to the sixth aspect, wherein tire radial direction outside ends of the stiffeners are positioned on tire radial direction inner sides of tire radial direction outside ends of the turn-back portions, and between the turn-back portions and the body portion, crack growth suppressing rubber layers whose elastic modulus is smaller than that of rubber configuring the stiffeners are disposed extending from the tire radial direction outside ends of the stiffeners toward the tire radial direction outside ends of the turn-back portions.

Next, the action of the pneumatic tire pertaining to the seventh aspect will be described.

In the pneumatic tire pertaining to the seventh aspect, the crack growth suppressing rubber layers whose elastic modulus is smaller than that of the rubber configuring the stiffeners are disposed on the tire radial direction outer sides of the stiffeners, so even in a case where, by some chance, separation has occurred in the tire radial direction outside parts of the stiffeners, tire radial direction outward growth of the separation that has occurred between the body portion and the turn-back portions is suppressed because of the presence of the crack growth suppressing rubber layers that are placed on the tire radial direction outer sides of the stiffeners and whose elastic modulus is small.

Advantageous Effects of Invention

As described above, the pneumatic tire pertaining to the first aspect is given the above configuration, so it has the superior effect that compressive strain produced in the carcass turn-back portions is suppressed, fatigue fracture of the carcass turn-back portions is suppressed, stress concentration in the rubber between the radial carcass cords of the turn-back portions and the radial carcass cords of the body portion is mitigated, and therefore the durability of the bead portions improves.

The pneumatic tire pertaining to the second aspect is given the above configuration, so a high stress concentration mitigating effect is obtained between the first sections and the second sections.

The pneumatic tire pertaining to the third aspect is given the above configuration, so a balance between securing the bending stiffness of the bead portions and reducing compressive strain produced in the radial carcass cords of the turn-back portions can be achieved at a high level.

The pneumatic tire pertaining to the fourth aspect is given the above configuration, so the occurrence of separation caused by stress concentration in the rubber between the radial carcass cords of the tire radial direction outside parts of the turn-back portions and the radial carcass cords of the body portion is suppressed.

The pneumatic tire pertaining to the fifth aspect is given the above configuration, so a high stress concentration mitigating effect is obtained with respect to the rubber between the radial carcass cords of the tire radial direction outside parts of the turn-back portions and the radial carcass cords of the body portion.

The pneumatic tire pertaining to the sixth aspect is given the above configuration, so a balance between stress concentration in the rubber between the radial carcass cords of the tire radial direction outside parts of the turn-back portions and reducing compressive strain of the radial carcass cords of the turn-back portions can be achieved at a high level.

The pneumatic tire pertaining to the seventh aspect is given the above configuration, so tire radial direction outward growth of separation that has occurred between the body portion and the turn-back portions is suppressed.

DESCRIPTION OF EMBODIMENT

An embodiment of the present invention will be described below on the basis of the drawings.

Figure 1:
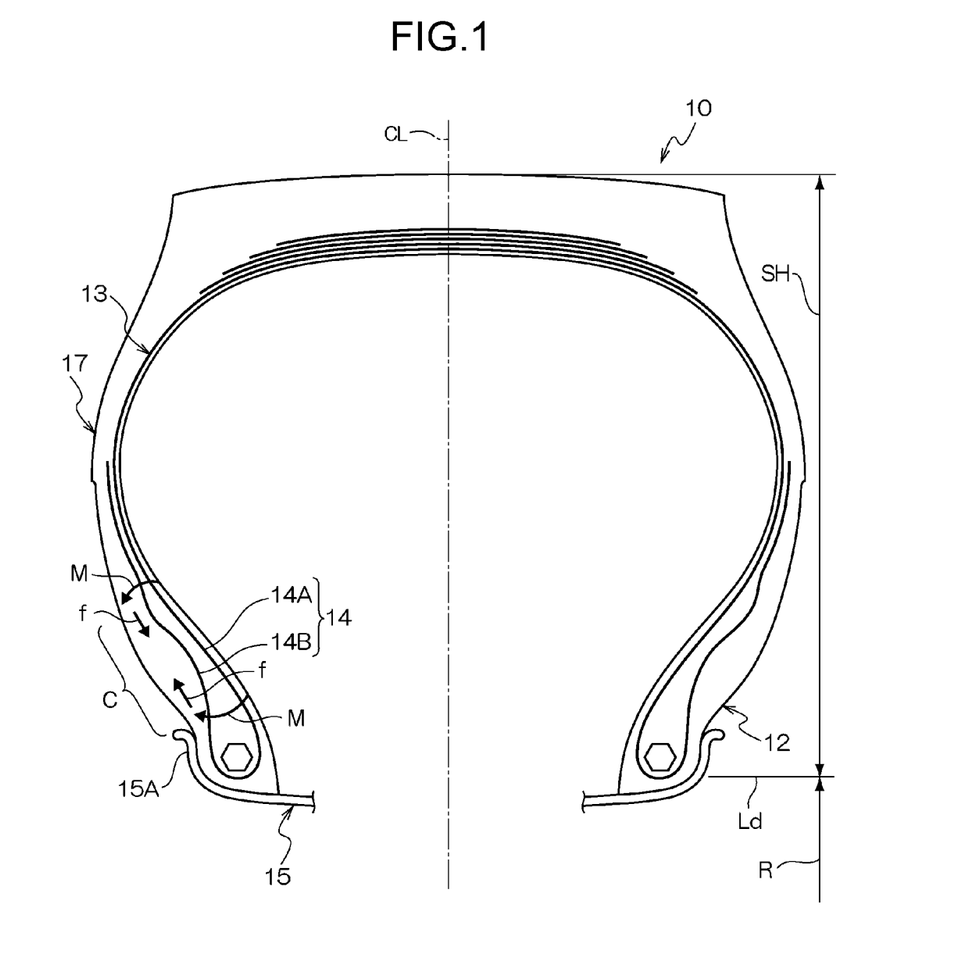
FIG. 1 is a cross-sectional view, along a tire rotational axis, of a pneumatic tire pertaining to an embodiment.

As shown in the cross-sectional view along a tire rotational axis of FIG. 1, a pneumatic tire 10 pertaining to the present embodiment is equipped with a carcass 13 that is disposed toroidally bridging a pair of bead portions 12. The carcass 13 of the present embodiment is configured from one carcass ply 14, both of whose tire width direction end sides are turned up from inward to outward in the tire width direction around bead cores 16 embedded in the bead portions 12. The section of the carcass ply 14 that bridges the one bead core 16 and the other bead core 16 will be called a body portion 14A, and the sections of the carcass ply 14 that are turned up outward in the tire width direction around the bead cores 16 will be called turn-back portions 14B.

The pneumatic tire 10 shown in FIG. 1 is a pneumatic radial tire for heavy loads and has an aspect ratio of 90%, and FIG. 1 shows a cross section along the tire rotational axis in a state in which the pneumatic tire 10 has been mounted on a rim 15 corresponding to the tire size prescribed by the TRA and inflated to an air pressure corresponding to the maximum load (maximum load rating) for a single wheel of the applicable size described in the standards.

The carcass ply 14 is a carcass ply of a common structure where plural cords (e.g., steel cords, organic fiber cords) lined up parallel to one another are coated with rubber, with the cords extending in the radial direction on the tire side portions and the cords extending in the tire axial direction at a tire equatorial plane CL. The body portion 14A of the carcass ply 14 overall has a substantially circular arc shape that is convex outward in the tire width direction excluding the neighborhoods of the bead cores.

Figure 2:
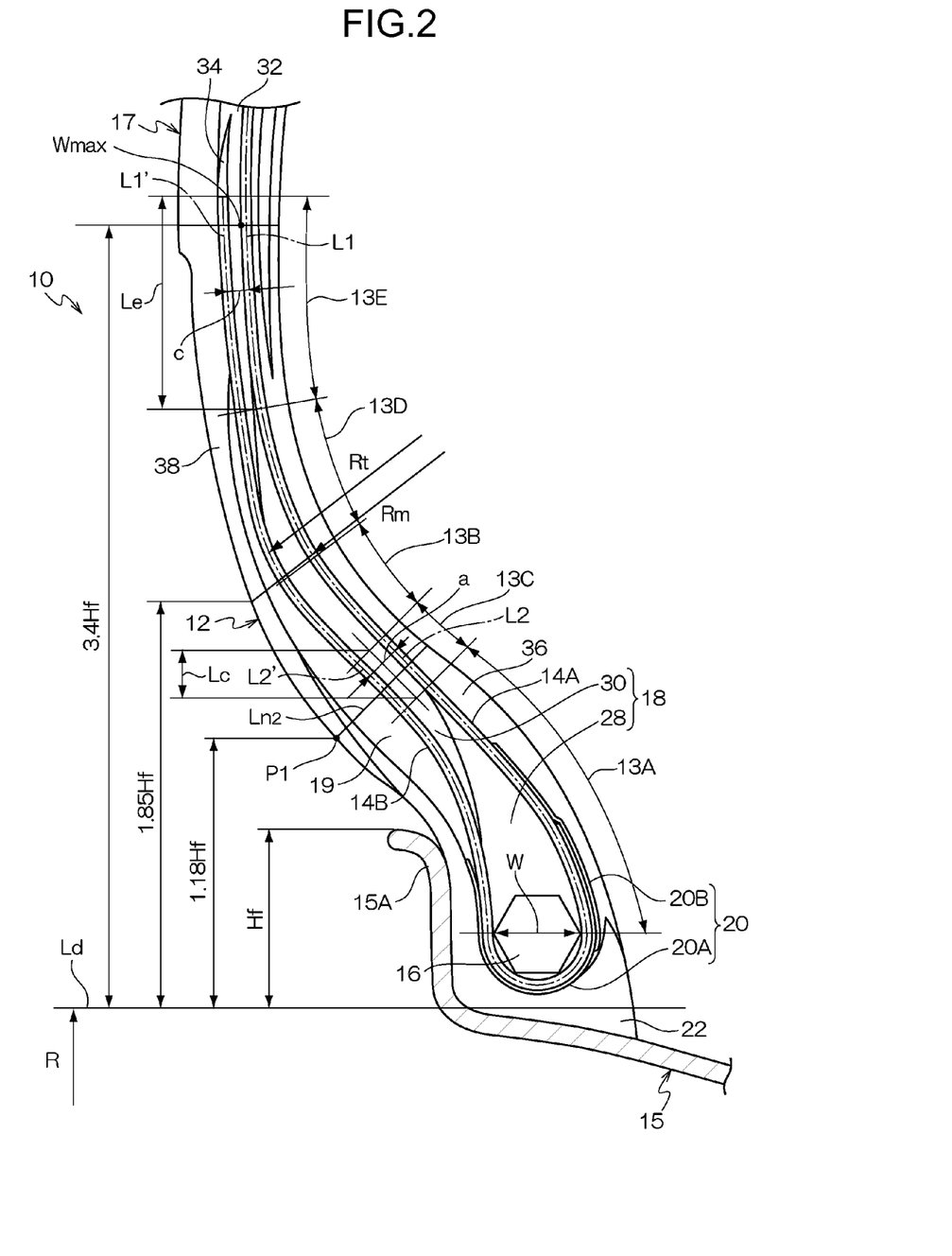
FIG. 2 is a cross-sectional view showing a bead portion and part of a sidewall portion of the pneumatic tire shown in FIG. 1.
Figure 3:
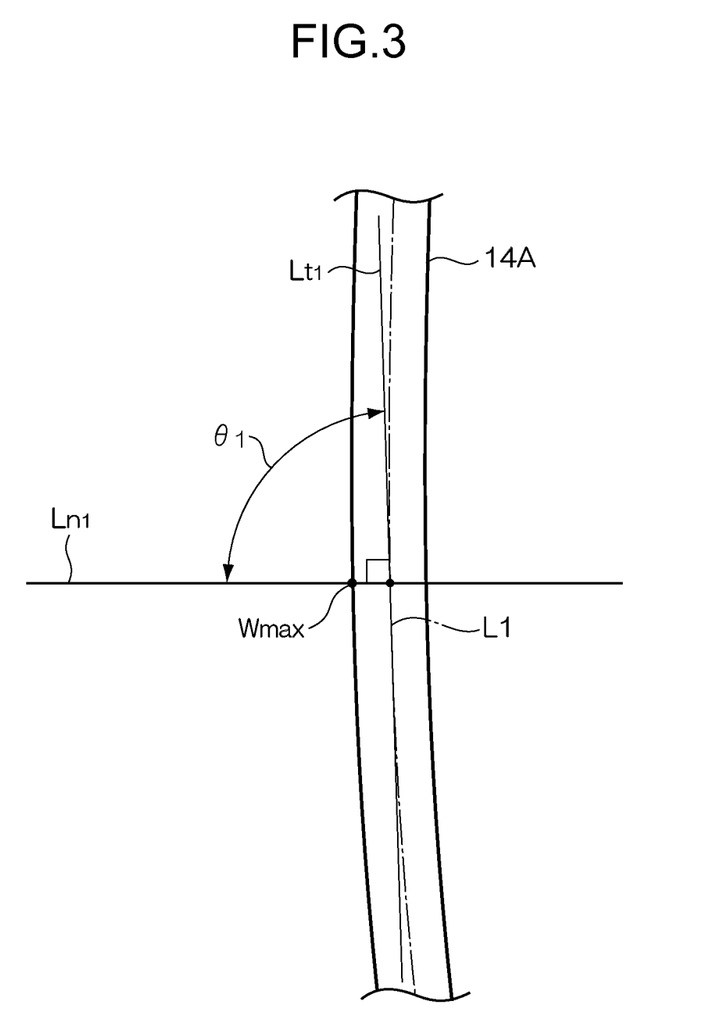
FIG. 3 is an enlarged cross-sectional view of a body portion in a first distance-invariant section.
Figure 4:
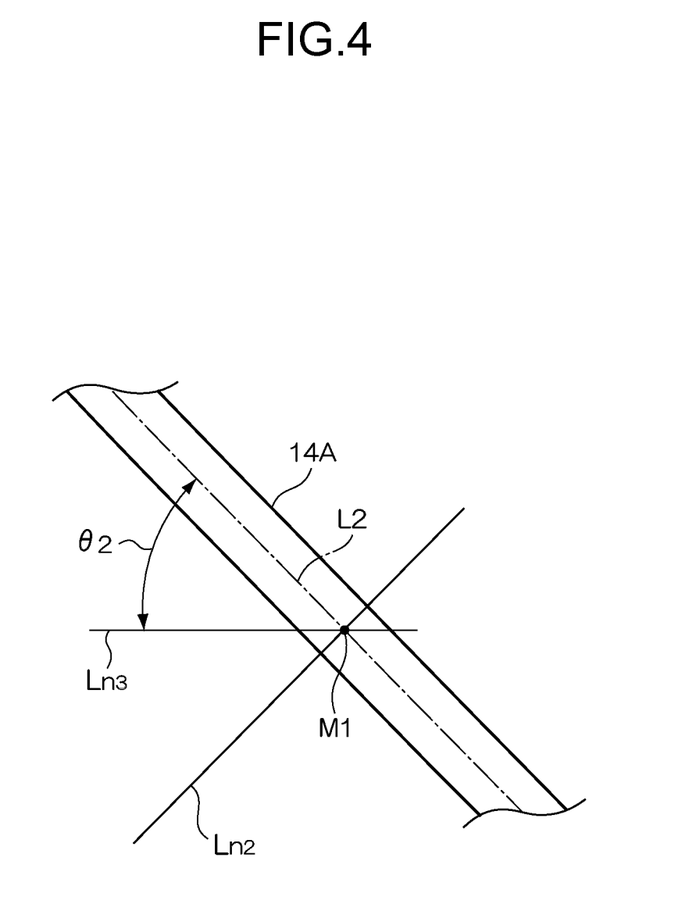
FIG. 4 is an enlarged cross-sectional view of the body portion in a second distance-invariant section.

As shown in FIG. 2, first stiffeners 18 are placed between the body portion 14A and the turn-back portions 14B of the carcass ply 14, and second stiffeners 19 are placed on the outer surface sides of the turn-back portions 14B.

What is characteristic about the carcass 13 of the present embodiment is its cross-sectional shape to the bead portions 12 and sidewall portions 17; that is to say, the distance of separation of the turn-back portions 14B with respect to the body portion 14A of the carcass ply 14 differs between sections.

As shown in FIG. 2, the inter-cord distance between the body portion 14A and the turn-back portions 14B of the carcass ply 14 first gradually decreases outward in the tire radial direction from the bead cores 16. These sections of the carcass 13 in which the inter-cord distance gradually decreases outward in the tire radial direction from the bead cores 16 will be called first sections 13A of the carcass 13 in the present embodiment.

In the carcass 13, second sections 13B in which the inter-cord distance gradually increases outward in the tire radial direction are disposed in positions outward in the tire radial direction away from the first sections 13A.

Additionally, in the carcass 13, the tire radial direction outside parts of the first sections 13A and the tire radial direction inside parts of the second sections 13B are interconnected by first distance-invariant sections 13C in which the inter-cord distance is constant. It is preferred that a length Lc of the first distance-invariant sections 13C as measured along the tire radial direction be set to the range of 40% to 60% of a rim flange height Hf of the rim 15 (see FIG. 1).

In the present embodiment, "the inter-cord distance is constant" is intended to include fluctuations in thickness within ±10% as error at the time of manufacture.

The tire radial direction outside part of the first section 13A is the part where the inter-cord distance is the smallest in the first section 13A, and the tire radial direction inside part of the second section 13B is the part where the inter-cord distance is the smallest in the second section 13B.

Here, when a denotes a minimum value of the inter-cord distance between the body portion 14A and the turn-back portions 14B in the first sections 13A, the first distance-invariant sections 13C, and the second sections 13B and W denotes a maximum width of the bead cores 16 as measured along the tire axial direction, it is preferred that a/W be set to the range of 0.3 to 0.5.

If the minimum value a is less than 0.3 of the maximum width W of the bead cores 16, the in-section bending stiffness of the first stiffeners ends up becoming insufficient. On the other hand, if the minimum value a exceeds 0.5 of the maximum width W of the bead cores 16, the turn-back portions 14B end up becoming too far away from the body portion 14A, and the compressive strain produced in the turn-back portion 14B ends up increasing remarkably. Moreover, if the turn-back portions 14B become too close to the outer surfaces of the bead portions 12, the shear strain of the rubber between the outer surfaces of the bead portions 12 and the turn-back portions 14B increases, and the durability of the bead portions 12 can no longer be improved.

Here, when a (see FIG. 2) denotes the minimum value of the inter-cord distance between the body portion 14A and the turn-back portions 14B in the first sections 13A, the first distance-invariant sections 13C, and the second sections 13B and b (see FIG. 5) denotes a maximum value of the inter-cord distance between the body portion 14A and the turn-back portions 14B in the second sections 13B, it is preferred that a/b be set to the range of 0.7 to 0.9. In the present embodiment, the minimum value a is the inter-cord distance in the first distance-invariant sections 13C, and the maximum value b is the inter-cord distance at the tire radial direction outermost end portions of the second sections 13B (the inter-cord distance at boundary parts between the second sections 13B and third sections 13D described later).

Third sections 13D in which the inter-cord distance gradually decreases outward in the tire radial direction are connected to the tire radial direction outside parts of the second sections 13B.

Moreover, second distance-invariant sections 13E that extend outward in the tire radial direction from the tire radial direction outside ends of the third sections 13D and in which the inter-cord distance is constant are disposed on the tire radial direction outside parts of the third sections 13D.

It is preferred that a length Le of the second distance-invariant sections 13E as measured along the tire radial direction be set to the range of 70% to 80% of the rim flange height Hf of the applicable rim.

Further, when c denotes the inter-cord distance in the second distance-invariant sections 13E, it is preferred that c/b be set to the range of 0.45 to 0.6.

In the present embodiment, a tire maximum width position Wmax of the body portion 14A of the carcass ply 14 is positioned on the tire radial direction outer side at a distance of 3.4 times the rim flange height Hf as measured from a baseline Ld extending parallel to the tire axial direction and serving as a reference when measuring a rim diameter R of the rim 15 prescribed by the TRA on which the pneumatic tire 10 is mounted. In the present embodiment, the tire maximum width position Wmax is positioned on the tire radial direction outer side at a distance of 3.4 times the rim flange height Hf, but the tire maximum width position Wmax is not limited to being positioned on the tire radial direction outer side at a distance of 3.4 times the rim flange height Hf.

Here, when θ1 denotes an angle (as measured on the tire radial direction outer side of the tire maximum width position Wmax and the tire outer surface side) formed by a line $L_{t1}$ tangential to the centerline of the cords in the part where the body portion 14A reaches its tire maximum width position Wmax and a line $L_{n1}$ parallel to the tire rotational axis, it is preferred that θ1 satisfy 80°<θ1<90°.

Further, it is preferred that the centerline of the cords in the vicinity of the tire maximum width position (definition: in the present embodiment, this means a range as far as positions separated 15% of the rim flange height Hf inward and outward in the tire radial direction centering on the tire maximum width position Wmax) extend substantially linearly. In the present embodiment, "substantially linearly" means that the radius of curvature is equal to or greater than 300 mm (with an upper limit of infinity).

The tire maximum width position Wmax in the present embodiment is located in the tire radial direction middle portions of the second distance-invariant sections 13E.

When R denotes the rim diameter, a normal line $L_{n2}$ is drawn toward the centerline of the cords of the body portion 14A from a tire outer surface position P1 located at a distance of R/2+1.18 Hf outward in the tire radial direction from the tire rotational center, M1 denotes a point of intersection between the normal line $L_{n2}$ and the centerline of the cords of the body portion 14A, and θ2 denotes an angle formed by a line tangential to the centerline of the cords of the body portion 14A and a line $L_{n3}$ parallel to the tire rotational axis at the point of intersection M1, it is preferred that 40°<θ2<50°.

The points of intersection M1 are located in the tire radial direction middle portions of the first distance-invariant sections 13C, and the vicinities of these points of intersection M1 are parts where deformation of the rubber when the bead portions 12 have collapsed because of a load becomes the greatest.

Here, in relation to resistance to heat build-up from the bead portions 12 to the sidewalls 17, reducing the gauge of the rubber that becomes the source of heat build-up (heat accumulation) is effective. To that end, bringing the body portion 14A and the turn-back portion 14B of the carcass ply 14 as close as possible to the tire outline (tire outer surface) is effective. And to that end, it is necessary to make the angle θ1 large and make the angle θ2 small.

Thus, it is preferred that θ1 be large and in the range of 80°<θ1<90° and that θ2 be small and in the range of 40°<θ2<50°.

If θ2 becomes equal to or less than 80°, the body portion 14A on the tire radial direction inner side from the tire maximum width position Wmax tends to open with respect to the turn-back portions 14B, and the volume of the rubber that becomes the source of heat build-up (heat accumulation) tends to increase such that heat build-up durability worsens between the body portion 14A on the tire radial direction inner side of the tire maximum width position Wmax and the turn-back portions 14B.

On the other hand, if θ1 becomes equal to or greater than 90°, the body portion 14A on the tire radial direction inner side from the tire maximum width position Wmax becomes closer to or contacts the turn-back portions 14B, and the shear strain between the body portion 14A and the turn-back portions 14B worsens.

Further, if the angle θ2 becomes too small, a rubber gauge W1pt on the tire axial direction outer side of the turn-back portions 14B and a rubber gauge W1tm between the turn-back portions 14B and the body portion 14A become smaller.

Here, if the rubber gauge W1pt on the tire radial direction outer sides of the turn-back portions 14B becomes too small, the durability of the rubber parts on the tire axial direction outer sides of the turn-back portions 14B drops because of the collapse of the bead portions 12 when a load is applied.

Further, if the rubber gauge W1tm between the turn-back portions 14B and the body portion 14A becomes too small, the shear strain of the coating rubber of the carcass ply 14 worsens when a load is applied, cracks tend to form, and durability drops.

Moreover, if the angle θ2 becomes too small, when the tire is subjected to a load and the bead portions 12 undergo collapsing deformation, the distance between the turn-back portions 14B and the bending neutral axis tends to increase on the tire radial direction inner sides from the points of measurement of the angle θ2, the input of compression with respect to the turn-back portions 14B tends to worsen, and the cutting durability of the cords (filaments) tends to drop.

Consequently, it is preferred that 40°<θ2<50°.

It is preferred that a centerline (L2) of the cords in the vicinity of the point of intersection M1 (in the present embodiment, this means a range as far as positions separated 45% of the rim flange height Hf inward and outward in the tire radial direction centering on the point of intersection M0 extend substantially linearly. (In Japan, dimensional measurements are performed in a state in which the pneumatic tire is mounted on a prescribed rim (a standard rim prescribed in the 2011 edition of the Year Book of the Japan Automobile Tyre Manufacturers Association, Inc. (JATMA)), the tire has been inflated to the prescribed internal pressure (an air pressure corresponding to the maximum load rating in the 2011 edition of the Year Book of the Japan Automobile Tyre Manufacturers Association, Inc. (JATMA), and the tire is in a no-load state. Outside of Japan, the internal pressure is the air pressure corresponding to the maximum load (maximum load rating) for a single wheel described in the following standards, and the rim is a standard rim (or "approved rim" or "recommended rim") of the applicable size described in the following standards. The standards are decided by the industrial standards in force in the region where the tire is produced or used. For example, in the U.S.A., it is the Year Book of the Tire and Rim Association, Inc., and in Europe, it is the Standards Manual of the European Tire and Rim Technical Organization.)

Here, it is preferred that the centerline L1 of the cords on the tire maximum width position side of the body portion 14A and the centerline of the cords on the point of intersection M1 side of the body portion 14A be interconnected by a circular arc of a radius Rm having a center of curvature on the tire inner side centering on a position separated a distance of 1.85 Hf outward in the tire radial direction from the baseline Ld.

It is preferred that the ratio Rm/Hf between the radius Rm and the rim flange height Hf satisfy $1.05 < Rm/Hf < 1.55$.

(Details of Turn-Back Portions)

In the turn-back portions 14B, it is preferred that a cord centerline (L1') in the vicinity of a point of intersection between the line $L_{n1}$ that passes through the tire maximum width position Wmax of the body portion 14A and is parallel to the tire axial direction and the centerline of the cords of the turn-back portions 14B and a cord centerline (L2') in the vicinity of a point of intersection between the normal line $L_{n2}$ drawn toward the centerline of the cords of the body portion 14A from the tire outer surface position P1 and the centerline of the cords of the turn-back portions 14B be smoothly interconnected by a circular arc of a radius Rt having a center of curvature on the tire inner side centering on a position separated a distance of 1.85 Hf outward in the tire radial direction from the baseline Ld.

Figure 5:
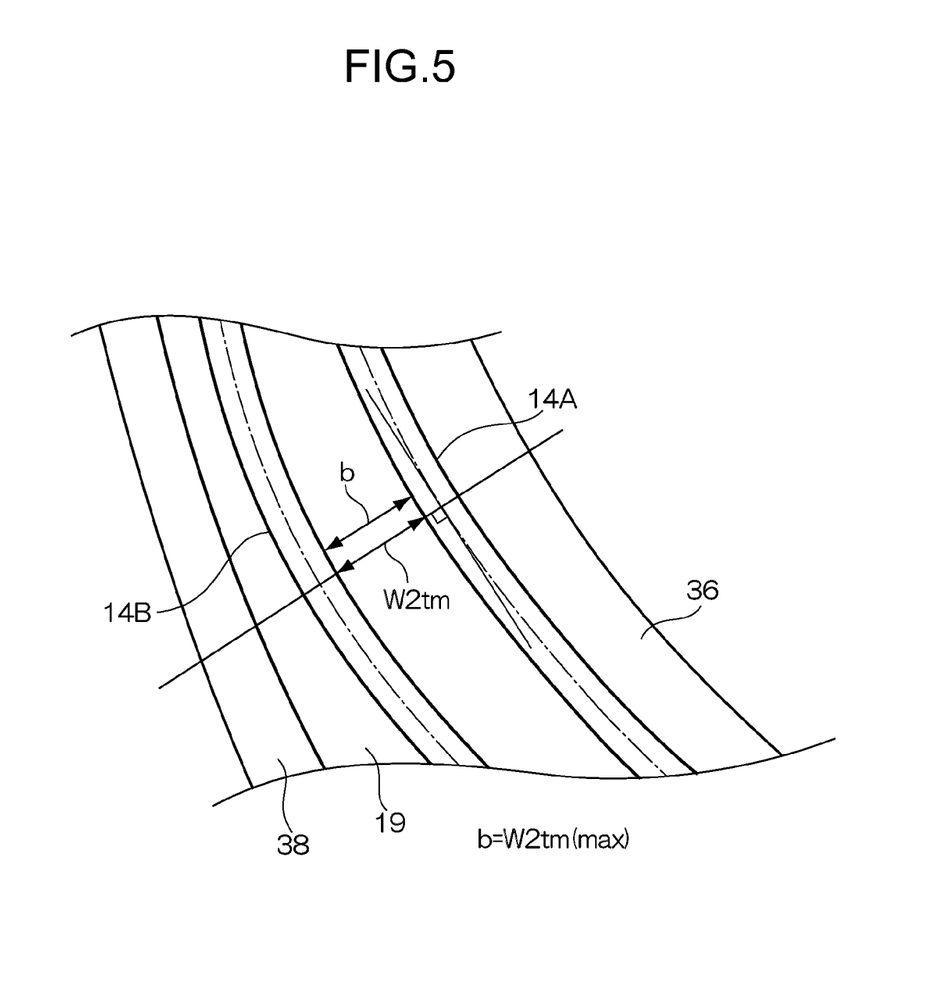
FIG. 5 is an enlarged cross-sectional view of a bead portion.
Figure 6:
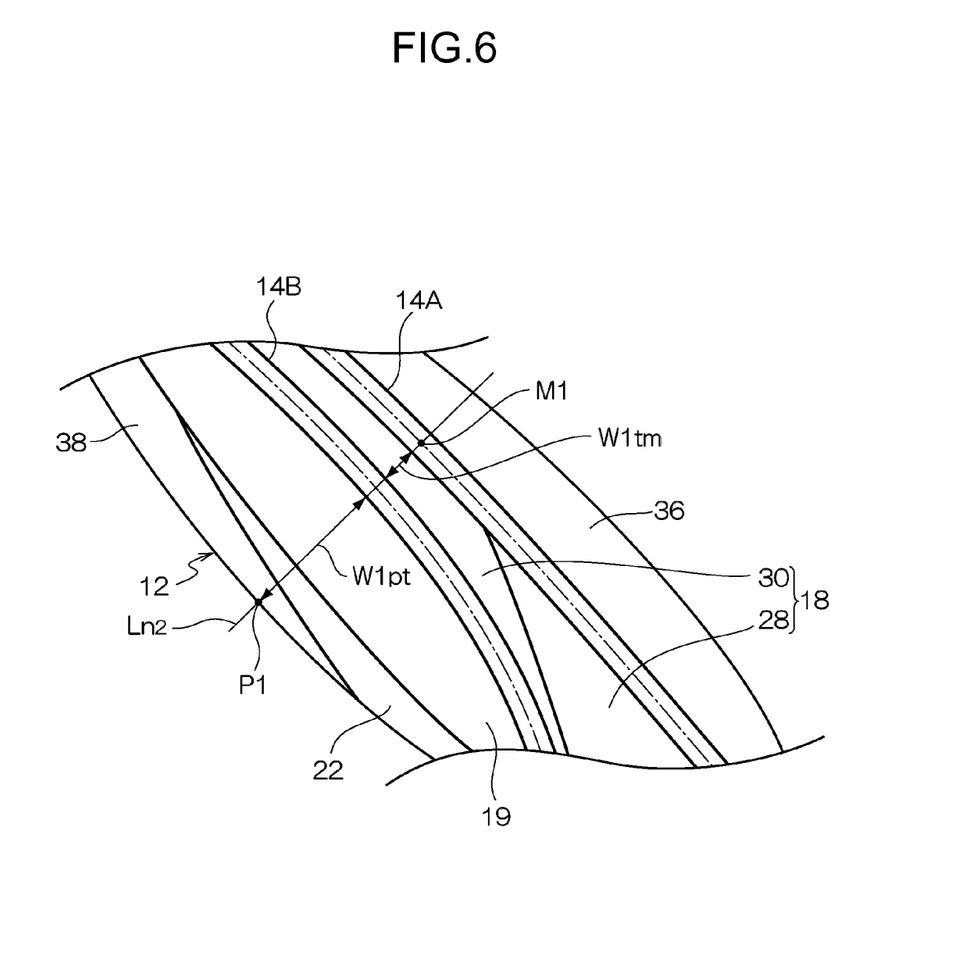
FIG. 6 is an enlarged cross-sectional view of the bead portion.

As for the cutting durability of the cords of the carcass ply 14, as shown in FIG. 5, by enlarging an inter-cord distance $W2_{tm}$ between the body portion 14A and the turn-back portions 14B in the second sections 13B and the third sections 13D, the in-section length of the cords of the turn-back portions 14B can be lengthened, and it becomes possible to mitigate the compressive strain acting on the cords.

Moreover, it is preferred that the ratio Rt/Hf between the rim flange height Hf and the radius Rt satisfy $0.60 < Rt/Hf < 1.05$, and it is more preferred that the ratio Rt/Rm satisfy $0.55 < Rt/Rm < 0.75$.

Here, if Rt/Rm becomes equal to or less than 0.55, the radius Rt of the turn-back portions 14B becomes too small with respect to the radius Rm of the body portion 14A, and the volume of rubber between the body portion 14A and the turn-back portions 14B increases, which becomes disadvantageous with respect to heat build-up.

On the other hand, if Rt/Rm becomes equal to or greater than 0.75, the radius Rt of the turn-back portions 14B becomes larger and approaches a straight line, the in-section length of the cords of the turn-back portions 14B can no longer be lengthened, and the compressive strain acting on the cords can no longer be mitigated.

Further, it is preferred that the positions of the tire radial direction outside ends of the turn-back portions 14B be set to the range of 0.7 Hf to 1.1 Hf outward in the tire radial direction from the baseline Ld.

If the positions of the tire radial direction outside ends of the turn-back portions 14B are positioned on the tire radial direction inner sides of this range, the compressive strain of the cords of the turn-back portion 14B worsens and triggers cord breakage.

On the other hand, if the positions of the tire radial direction outside ends of the turn-back portions 14B are positioned on the tire radial direction outer sides of this range, stress concentration in the rubber between the body portion 14A and the turn-back portions 14B of the carcass ply 14 cannot be mitigated.

(Stiffeners)

The first stiffeners 18 are placed between the body portion 14A and the turn-back portions 14B of the carcass ply 14, and the second stiffeners 19 are placed on the outer surface sides of the turn-back portions 14B.

The first stiffeners 18 extend outward in the tire radial direction from the bead cores 16. The first stiffeners 18 of the present embodiment have plural rubber portions of different hardnesses: hard rubber portions 28 whose thickness gradually decreases outward in the tire radial direction from the bead cores 16 and soft rubber portions 30 that are placed on the tire radial direction outer sides of the hard rubber portions 28 and whose modulus at 100% elongation is smaller (that is, softer) than that of the hard rubber portions 28.

In the present embodiment, the tire radial direction outside ends of the hard rubber portions 28 are located in positions 1.35 Hf outward in the tire radial direction from the baseline Ld.

On the other hand, the tire radial direction inside ends of the soft rubber portions 30 are located in positions 0.75 Hf outward in the tire radial direction from the baseline Ld, and the tire radial direction outside ends of the soft rubber portions 30 are located in positions 2.8 Hf outward in the tire radial direction from the baseline Ld.

The thickness of the hard rubber portions 28 gradually decreases outward in the tire radial direction from the bead cores 16. The thickness of the soft rubber portions 30 gradually decreases inward in the tire radial direction in the vicinities of their tire radial direction inside ends and gradually decreases outward in the tire radial direction in the vicinities of their tire radial direction outside ends.

The tire radial direction outside ends of the first stiffeners 18 are positioned on the tire radiation direction inner sides of the tire radial direction outside ends of the turn-back portions 14B of the carcass ply 14.

On the tire radial direction outer sides of the first stiffeners 18, crack growth suppressing rubber layers 32 are placed between the body portion 14A and the turn-back portions 14B. The crack growth suppressing rubber layers 32 extend further in the tire radial direction than the tire radial direction outside ends of the turn-back portions 14B along the outer surface of the body portion 14A and terminate on the tire radial direction inner sides of width direction end portions of a belt not shown in the drawings.

Here, it is preferred that the modulus at 100% elongation of the hard rubber portions 28 be set to the range of 6.9 to 7.6 MPa, and it is preferred that the modulus at 100% elongation of the soft rubber portions 30 be set to the range of 2.3 to 2.5 MPa.

The reason lower limits are disposed on the moduli at 100% elongation of the hard rubber portions 28 and the soft rubber portions 30 in the first stiffeners 18 is because when the moduli at 100% elongation fall below these lower limits, the amount of collapsing deformation of the bead portions 12 when a load acts on the tire becomes larger and the durability of the bead portion 12 cannot be secured. Further, the reason upper limits are disposed is because when the moduli at 100% elongation exceed these upper limits, the stiffeners 18 become too hard and breakage of the stiffeners 18 themselves tends to occur.

Further, for the crack growth suppressing rubber layers 32, rubber in which it is more difficult for cracks to growth than in the soft rubber portions 30—such as, for example, rubber whose modulus at 100% elongation is lower than that of the soft rubber portions 30—is preferred, and it is preferred that the crack growth suppressing rubber layers 32 have a modulus at 100% elongation in the range of 1.3 to 1.5 MPa.

Moreover, the second stiffeners 19 are disposed along the outer surfaces of the turn-back portions 14B from the first sections 13A to the second distance-invariant sections 13E, the parts of the second stiffeners 19 opposing the first distance-invariant sections 13C—that is, the thin parts in the lengthwise direction middle portions of the first stiffeners 18—are formed the thickest, and the thickness of the second stiffeners 19 gradually decreases outward in the tire radial direction and inward in the tire radial direction. The combined stiffness of the first stiffeners 18 and the second stiffeners 19 tends to gradually decrease in the tire radial direction from the bead cores 16.

Here, it is preferred that the modulus at 100% elongation of the second stiffeners 19 be set to the range of 2.0 to 2.2 MPa.

Chafer layers 20 each having a first chafer 20A and a second chafer 20B are placed on the outer sides of the carcass ply 14 wrapped around the bead cores 16.

Further, rubber chafers 22 that extend from the bead toes via the bead heels outward in the tire radial direction around the tire axial direction outer sides of the turn-back portions 14B are disposed in the bead portions 12.

An inner liner 36 is disposed on the tire inner surface side of the carcass 13, and a side rubber layer 38 is disposed on the tire axial direction outer surface side of the carcass 13.

(Action)

Next, the action of the pneumatic tire 10 pertaining to the present embodiment will be described.

When the pneumatic tire 10 is subjected to a load, as shown in FIG. 1, bending moments M act on the bead portions 12 in accompaniment with deformation in which the bead portions 12 collapse outward in the tire axial direction in the regions on the tire radial direction outer sides of flanges 15A of the rim 15. Because of this, taking the bending neutral axis as a boundary, tensile force acts on the tire inner sides of the bead portions and compressive force f acts on the tire outer sides of the bead portions in the vicinities of regions C shown in FIG. 1. The compressive force f acts on the cords of the turn-back portions 14B of the carcass ply 14 turned back around the bead cores and produces compressive strain, and when the compressive strain becomes excessive, there are cases where this leads to fatigue fracture of the cords of the carcass ply 14.

In the pneumatic tire 10 of the present embodiment, the turn-back portions 14B are brought closer to the body portion 14A in the first distance-invariant sections 13C of the carcass 13, so the compressive force acting on the cords of the turn-back portions 14B when the bead portions 12 have become deformed by the load can be reduced, and high durability is obtained for the cords of the turn-back portions 14B.

Moreover, the first distance-invariant sections 13C that extend in the tire radial direction are disposed between the first sections 13A in which the inter-cord distance between the body portion 14A and the turn-back portions 14B gradually decreases outward in the tire radial direction and the second sections 13B in which the inter-cord distance gradually increases outward in the tire radial direction, and the direction of the cords of the turn-back portions 14B is not suddenly changed between the first sections 13A and the second sections 13B, so in the middle parts between the first sections 13A and the second sections 13B, it becomes difficult for stress to concentrate in the rubber between the cords of the turn-back portions 14B and the cords of the body portion 14A at the time of the collapsing deformation of the bead portions 12.

For this reason, cracks forming in the rubber between the cords of the body portion 14A and the cords of the turn-back portion 14B between the first sections 13A and the second sections 13B can be suppressed, and the durability of the bead portions 12 can be improved compared to conventional tires.

Further, in the pneumatic tire 10 of the present embodiment, the second distance-invariant sections 13E in which the inter-cord distance is constant are disposed on the tire radial direction outer sides of the third sections 13D in which the inter-cord distance between the body portion 14A and the turn-back portions 14B gradually decreases outward in the tire radial direction, so it becomes difficult for stress to concentrate in the tire radial direction outside parts of the third sections 13B at the time of the collapsing deformation of the bead portion 12, and the occurrence of cracks in the rubber between the cords of the body portion 14A and the cords of the turn-back portions 14B can be suppressed.

By setting the length Le of the second distance-invariant sections 13E as measured along the tire radial direction to the range of 70% to 80% of the rim flange height Hf of the applicable rim, a high stress concentration mitigating effect is obtained with respect to the rubber between the cords of the tire radial direction outside parts of the turn-back portions 14B and the cords of the body portion 14A (see test example 4).

By setting the ratio c/b between the inter-cord distance c in the second distance-invariant sections 13E and the maximum value b to the range of 0.45 to 0.6, a balance between obtaining a high stress concentration mitigating effect with respect to the rubber between the cords of the tire radial direction outside parts of the turn-back portions 14B and the cords of the body portion 14A and reducing the compressive strain of the cords of the turn-back portions 14B can be achieved (see test example 5).

By setting the length Lc of the first distance-invariant sections 13C as measured along the tire radial direction to the range of 40% to 60% of the rim flange height Hf of the rim 15, a high stress concentration mitigating effect can be obtained (see test example 2).

By setting the ratio a/b between the minimum value a and the maximum value b to the range of 0.7 to 0.9, a balance between securing the bending stiffness of the bead portion 12 and reducing the compressive strain produced in the cords of the turn-back portions 14B can be achieved at a high level (see test example 3).

Moreover, in the pneumatic tire 10 of the present embodiment, the crack growth suppressing rubber layers 32 whose elastic modulus is smaller than that of the rubber configuring the stiffeners 18 are disposed on the tire radial direction outer sides of the first stiffeners 18, so even in a case where, by some chance, separation has occurred in the tire radial direction outside parts of the stiffeners 18, tire radial direction outward growth of the separation can be suppressed because of the presence of the crack growth suppressing rubber layers 32.

Other Embodiments

The carcass 13 of the pneumatic tire 10 of the above embodiment has one carcass ply 14, but it may also have two or more carcass plies 14. In a case where the pneumatic tire 10 has a plurality of carcass plies 14, the prescriptions for the dimensions of each portion are applied to the carcass ply 14 closest to the stiffeners.

The pneumatic tire 10 of the above embodiment is for construction vehicles, but the invention of the present application can also be applied to other types of tires, such as tires for trucks and buses and tires for passenger cars. The above embodiment is an example of the present invention and can be changed in various ways without departing from the gist of the present invention.

Test Example 1

Tires pertaining to a working example and a conventional example were produced and a bead portion durability test was performed under the conditions shown in table 1. Both tires were tires for construction vehicles with a tire size of 27.00 R49.

Strain calculation by FEM and an actual tire drum test were carried out using the specifications shown in the table below.

The test tires were as follows.

Tire of working example: a tire having the structure of the above embodiment.

Tire of conventional example: a tire in which the constant-gauge first distance-invariant sections are not disposed between the first sections and the second sections (the direction of the turn-back portions suddenly changes between the first sections and the second sections).

(1) Strain Evaluation (FEM)

Strain when the tires were pushed forward using the standard rim (TRA), the normal internal pressure (TRA), and the normal load (TRA) was found by FEM. The evaluation used an index taking the strain of the conventional example as 100, with stress being smaller the smaller the numerical value was.

(2) Durability Evaluation (Drum Test)

The test tires were mounted on standard rims (TRA), thereafter inflated to the normal internal pressure (TRA), and subjected to a load equal to 100% of the normal load (TRA) under a speed of 8 km/h and a drum diameter of 5 m, the temperatures of the bead portions were measured, thereafter the test tires were subjected to a load equal to 170% of the normal internal pressure (TRA), a durability test was performed, the tires were made to travel for 500 hours, the tires were cut, and the state of failure of the bead portions was evaluated.

The evaluation method was as follows.

Shear strain on outer sides of turn-back portions (FEM) and compressive strain of coating rubber of cords of carcass ply (FEM): used an index taking the strain of the conventional example as 100, with strain being smaller the smaller the numerical value was. For the compressive strain of the cords of the carcass plies, the strain in the carcass ply cord direction was calculated in FEM (under the conditions of the normal internal pressure and the normal load).

Heat build-up in bead portions (drum test): the temperature at the point of intersection shown in FIG. 2 between the normal line $L_{n2}$ drawn from the tire outer surface position P1 to the body portion 14A of the carcass 13 and the turn-back portions 14B of the carcass 14 was measured with a thermocouple.

Carcass cord break-up (drum test): whether or not the cords had cut was visually inspected.

Bead portion failure (drum test): the cross sections of the bead portions were visually inspected.

TABLE 1

|  |  | Conventional Example | Working Example |
|---|---|---|---|
|  | θ1 | 75° | 88° |
|  | θ2 | 55° | 45° |
|  | Rm/Hf | 2.23 | 1.27 |
|  | Rt/Rm | 0.96 | 0.65 |
|  | a/b | 0.6 | 0.8 |
|  | c/b | 0.85 | 0.52 |
|  | First Distance-invariant Sections | None | Yes |
|  | Length Lc of First Distance-invariant Sections | — | 50 mm |
|  | Cord Distance (a) Between First Sections and Second Sections | 20 mm | 15.5 mm |
| FEM | Shear Strain on Outer Sides of Turn-back Portions | 100 | 97 |
|  | Shear Strain of Coating Rubber of Carcass Ply | 100 | 100 |
| Drum Test | Compressive Strain of Carcass Ply | 100 | 98 |
|  | Heat Build-up in Bead Portions | Control | −5° C. |
|  | Carcass Cord Break-up | None | None |
|  | Bead Portion Failure | Cracks in Coating Rubber of Carcass Ply | Complete run; no cracks |
|  | Running Time (h) | 500 | 500 |

As a result of the test, in the tire of the conventional example, cord break-up did not occur in the turn-back portions after the end of the drum test, but cracks occurred in the coating rubber of the carcass ply.

On the other hand, in the tire of the working example, cord break-up did not occur in the turn-back portions and there was also no failure in the bead portions.

Test Example 2

Five types of tires in which the ratio Lc/Hf between the length Lc of the first distance-invariant sections and the rim flange height Hf differed from one another were produced, and the shear strain of the turn-back portions, the shear strain of the coating rubber of the carcass plies, and the bending stiffness of the bead portions were found by FEM. The evaluation used an index taking tire 1 as 100; in relation to strain, the smaller the numerical value was the better the evaluation was, and for bending stiffness, the larger the numerical value was the better the evaluation was.

TABLE 2

|  | Tire 1 | Tire 2 | Tire 3 | Tire 4 | Tire 5 |
|---|---|---|---|---|---|
| Lc/Hf | 0.3 | 0.4 | 0.5 | 0.6 | 0.7 |
| Shear Strain on Outer Sides of Turn-back Portions | 100 | 98 | 96 | 94 | 92 |
| Shear Strain of Coating Rubber of Carcass Ply | 100 | 99 | 98 | 97 | 96 |
| Bending Stiffness of Bead Portions | 100 | 95 | 89 | 84 | 80 |

From the results of the test, setting Lc/Hf to the range of 0.4 to 0.6 is considered good for a balance between strain and stiffness.

Test Example 3

Five types of tires in which the ratio a/b between the minimum value a of the inter-cord distance between the body portion 14A and the turn-back portions 14B in the first sections 13A, the first distance-invariant sections 13C, and the second sections 13B and the maximum value b of the inter-cord distance between the body portion 14A and the turn-back portions 14B in the second sections 13B differed from one another were produced, and the shear strain on the outer sides of the turn-back portions, the compressive strain of the cords of the turn-back portions, and the bending stiffness of the bead portions were found by FEM. The evaluation used an index taking tire 2 as 100; in relation to strain, the smaller the numerical value was the better the evaluation was, and for bending stiffness, the larger the numerical value was the better the evaluation was. In all the tires, the maximum value b was set to 17.5 mm and the minimum value a was varied.

TABLE 3

|  | Tire 1 | Tire 2 | Tire 3 | Tire 4 | Tire 5 |
| --- | --- | --- | --- | --- | --- |
| a/b | 0.55 | 0.65 | 0.75 | 0.85 | 0.95 |
| Shear Strain on Outer Sides of Turn-back Portions | 110 | 100 | 95 | 90 | 85 |
| Shear Strain of Coating Rubber of Carcass Ply | 105 | 100 | 99 | 101 | 103 |
| Bending Stiffness of Bead Portions | 80 | 100 | 110 | 125 | 110 |

From the results of the test, setting a/b to the range of 0.7 to 0.9 is considered good for a balance between strain and stiffness.

Test Example 4

Five types of tires in which the ratio Le/Hf between the length Le of the second distance-invariant sections 13E and the rim flange height Hf differed from one another were produced, and the shear strain on the outer sides of the turn-back portions and the compressive strain of the cords of the turn-back portions were found by FEM. The evaluation used an index taking tire 4 as 100, and the smaller the numerical value was the better the evaluation was. The inter-cord distance c between the body portion 14A and the turn-back portions 14B in the second distance-invariant sections 13E was set to 10 mm in all the tires.

TABLE 4

|  | Tire 1 | Tire 2 | Tire 3 | Tire 4 | Tire 5 |
| --- | --- | --- | --- | --- | --- |
| Le/Hf | 0.45 | 0.6 | 0.75 | 0.9 | 1.05 |
| Shear Strain on Outer Side of Turn-back Portions | 107 | 105 | 102 | 100 | 98 |
| Shear Strain of Cords of Turn-back Portions | 87 | 91 | 95 | 100 | 104 |

From the results of the test, setting Le/Hf to the range of 0.7 to 0.85 is considered good.

Test Example 5

Five types of tires in which the ratio c/b between the inter-cord distance c between the body portion 14A and the turn-back portions 14B in the second distance-invariant sections 13E and the maximum value b of the inter-cord distance between the body portion 14A and the turn-back portions 14B in the second sections 13B differed from one another were produced, and the shear strain on the outer sides of the turn-back portions and the compressive strain of the cords of the turn-back portions were found by FEM. The evaluation used an index taking tire 5 as 100; in relation to strain, the smaller the numerical value was the better the evaluation was, and for bending stiffness, the larger the numerical value was the better the evaluation was. The length Le of the second distance-invariant sections 13E was set to 80 mm in all the tires.

TABLE 5

|  | Tire 1 | Tire 2 | Tire 3 | Tire 4 | Tire 5 |
| --- | --- | --- | --- | --- | --- |
| c/b | 0.4 | 0.45 | 0.55 | 0.6 | 0.8 |
| Shear Strain on Outer Sides of Turn-back Portions | 107 | 103 | 101 | 100 | 100 |
| Shear Strain of Cords of Turn-back Portions | 92 | 94 | 96 | 98 | 100 |

From the results of the test, setting c/b to the range of 0.45 to 0.6 is considered good.

The invention claimed is:

1. A pneumatic tire comprising:
a carcass that is disposed toroidally bridging a pair of bead portions, the carcass having a carcass ply that includes plural radial carcass cords and that is equipped with a body portion positioned between the bead portions and with turn-back portions turned back from an inner side to an outer side around bead cores of the bead portions, and the carcass having first sections in which an inter-cord distance between the body portion and the turn-back portions gradually decreases outward in a tire radial direction from the bead cores, second sections that are disposed on the tire radial direction outer sides of the first sections and in which the inter-cord distance between the body portion and the turn-back portions of the carcass ply gradually increases outward in the tire radial direction from the bead cores, and first distance-invariant sections that interconnect tire radial direction outside parts of the first sections and tire radial direction inside parts of the second sections and in which the inter-cord distance between the body portion and the turn-back portions is constant within ±10 percent; and
stiffeners that are placed between the carcass body portion and the turn-back portions and extend outward in the tire radial direction from the bead cores,
wherein a length of the first distance-invariant sections as measured along the tire radial direction is within a range of from 40% to 60% of a rim flange height of an applicable rim, and
wherein the carcass further has third sections that are disposed on the tire radial direction outer sides of the second sections and in which the inter-cord distance between the body portion and the turn-back portions of the carcass ply gradually decreases outward in the tire radial direction from the bead cores and second distance-invariant sections that extend from tire radial direction outside parts of the third sections to tire radial direction outside parts of the turn-back portions and in which the inter-cord distance between the body portion and the turn-back portions is constant within ±10 percent,
wherein a length of the second distance-invariant sections as measured along the tire radial direction is within a range of from 70% to 85% of a rim flange height of an applicable rim.

2. The pneumatic tire according to claim 1, wherein when a denotes a minimum value of the inter-cord distance between the body portion and the turn-back portions in the first sections, the first distance-invariant sections, and the second sections and b denotes a maximum value of the inter-cord distance between the body portion and the turn-back portions in the second sections, a/b is within a range of from 0.7 to 0.9.

3. The pneumatic tire according to claim 1, wherein when b denotes a maximum value of the inter-cord distance between the body portion and the turn-back portions in the second sections and c denotes the inter-cord distance in the second distance-invariant sections, c/b is within a range of from 0.45 to 0.60.

4. The pneumatic tire according to claim 1, wherein
tire radial direction outside ends of the stiffeners are positioned on tire radial direction inner sides of tire radial direction outside ends of the turn-back portions, and
between the turn-back portions and the body portion, crack growth suppressing rubber layers whose elastic modulus is smaller than that of rubber configuring the stiffeners are disposed extending from the tire radial direction outside ends of the stiffeners toward the tire radial direction outside ends of the turn-back portions.

* * * * *